(12) United States Patent
Bakke

(10) Patent No.: US 8,625,666 B2
(45) Date of Patent: Jan. 7, 2014

(54) 4:4:4 COLOR SPACE VIDEO WITH 4:2:0 COLOR SPACE VIDEO ENCODERS AND DECODERS SYSTEMS AND METHODS

(75) Inventor: Steve Bakke, Richardson, TX (US)

(73) Assignee: Netzyn, Inc.

( * ) Notice: Subject to any disclaimer, the term of this patent is extended or adjusted under 35 U.S.C. 154(b) by 363 days.

(21) Appl. No.: 13/178,115

(22) Filed: Jul. 7, 2011

(65) Prior Publication Data

US 2012/0008679 A1    Jan. 12, 2012

Related U.S. Application Data

(60) Provisional application No. 61/361,967, filed on Jul. 7, 2010.

(51) Int. Cl.
*H04N 7/12* (2006.01)
*H04N 7/26* (2006.01)

(52) U.S. Cl.
USPC ............ 375/240.08; 375/240.01; 375/240.02; 375/240.1; 375/240.11; 345/589; 345/600; 345/604; 345/605; 348/453; 348/455; 348/456; 348/488; 382/165; 382/166; 382/167

(58) Field of Classification Search
USPC ............... 375/240.01, 240.02, 240.08, 240.1, 375/240.11; 345/589, 600, 604, 605; 348/43, 46, 453, 455, 456, 488; 382/165, 166, 167

See application file for complete search history.

(56) References Cited

U.S. PATENT DOCUMENTS

| | | | | |
|---|---|---|---|---|
| 5,412,428 A * | 5/1995 | Tahara | ...................... | 375/240.25 |
| 5,982,432 A * | 11/1999 | Uenoyama et al. | ...... | 375/240.01 |
| 6,195,390 B1 * | 2/2001 | Hashino et al. | .......... | 375/240.21 |
| 6,674,479 B2 * | 1/2004 | Cook et al. | ..................... | 348/453 |
| 7,688,334 B2 * | 3/2010 | Li | ................... | 345/604 |
| 8,139,081 B1 * | 3/2012 | Daniel | .......................... | 345/600 |
| 2010/0171817 A1 * | 7/2010 | Tourapis et al. | ................ | 348/51 |

OTHER PUBLICATIONS

Senda. JP2000-092512 JPO Full Text and Abstract Translation. Mar. 2000.*

* cited by examiner

*Primary Examiner* — Christopher S Kelley
*Assistant Examiner* — Zhihan Zhou
(74) *Attorney, Agent, or Firm* — The Law Firm of H. Dale Langley, Jr., P.C.

(57) ABSTRACT

A system for communicating video, the video including 4:4:4 color space frames, includes a 4:2:0 video encoder having a 4:4:4 to 4:2:0 color space frame converter and a 4:2:0 video decoder having a 4:2:0 to 4:4:4 color space frame converter, communicatively connected to the 4:2:0 video encoder. The 4:2:0 video encoder, without conversion by the 4:4:4 to 4:2:0 color space converter, communicates the video as a plurality of encoded 4:2:0 color space frames to the decoder. The 4:2:0 video decoder, without conversion by the 4:2:0 to 4:4:4 color space frame converter, saves the video as a plurality of 4:4:4 color space frames in memory. Each of the 4:4:4 color space frames in memory of the decoder device is identical to its corresponding 4:4:4 color space frame of the video at the encoder device.

19 Claims, 6 Drawing Sheets

2 Colors 4:4:4 = 2 Colors

| C1 | C1 | C1 | C1 |
|----|----|----|----|
| C1 | C2 | C2 | C1 |
| C1 | C2 | C2 | C1 |
| C1 | C2 | C2 | C1 |
| C1 | C2 | C2 | C1 |
| C1 | C1 | C1 | C1 |

2 Colors 4:2:0 = 4 Colors

| C3 | C3 | C3 | C3 |
|----|----|----|----|
| C3 | C4 | C4 | C3 |
| C5 | C6 | C6 | C5 |
| C5 | C6 | C6 | C5 |
| C3 | C4 | C4 | C3 |
| C3 | C3 | C3 | C3 |

Fig. 2

2 Colors 4:4:4 = 2 Colors

| C1 | C1 | C2 | C2 |
|----|----|----|----|
| C1 | C1 | C2 | C2 |
| C1 | C1 | C2 | C2 |
| C1 | C1 | C2 | C2 |
| C2 | C2 | C2 | C2 |
| C2 | C2 | C2 | C2 |

2 Colors 4:2:0 = 2 Colors

| C1 | C1 | C2 | C2 |
|----|----|----|----|
| C1 | C1 | C2 | C2 |
| C1 | C1 | C2 | C2 |
| C1 | C1 | C2 | C2 |
| C2 | C2 | C2 | C2 |
| C2 | C2 | C2 | C2 |

Fig. 3

4:4:4 COLOR SPACE VIDEO WITH 4:2:0 COLOR SPACE VIDEO ENCODERS AND DECODERS SYSTEMS AND METHODS

CROSS-REFERENCE TO RELATED APPLICATION

The present application is a conversion of and has benefit of priority of the following application, which is and has at least one same inventor of the present application: U.S. Provisional Patent Application No. 61/361,967, titled "4:4:4 Color Space Video with 4:2:0 Color Space Video Encoders and Decoders Systems and Methods", filed Jul. 7, 2010.

TECHNICAL FIELD

The invention generally relates to encode and decode devices, networks, and networked communications of digital compressed video in encoding and decoding systems and methods, and more particularly relates to systems and methods for 4:2:0 color space video encoders and decoders to render 4:4:4 color space video.

BACKGROUND

Most video encoding and decoding systems operate on data representing video using a 4:2:0 color space. The 4:2:0 color space is useful when employed for display of movies and TV shows, however, greater definition and detail is possible with a 4:4:4 color space, such as may be desirable for computer graphic information type video. Such 4:4:4 color space for video encoding/decoding, however, has not been possible with many systems because often the encoder and decoder hardware and software operates only on video in the 4:2:0 color space. The systems and methods of this invention provide for rendering 4:4:4 color space video, using encoders and decoders that only support the 4:2:0 color space.

As will be understood, video and/or display graphics, such as that communicated from one point (or node or computer or device) to another point (or node or computer or device) on a network, is encoded by the sender and then decoded by the recipient. This can reduce the quantity of data that must be communicated and thereby reduces the bandwidth required for the communication. Typical video encoding and decoding technical standards include MPEG1, MPEG2, H.263, VC-1 and H.264. These encoding and decoding standards are similarly processed by encoders and decoders of devices, e.g., processed manipulation, copying and handling of files and frames of files are similar in encode and decode processing operations.

Traditionally, the encoders and decoders, and their respective processes, have been employed for communicating movie and TV type video over networks. Because of the nature of this type of video, the data representing the video has employed the 4:2:0 color space for purpose of encoding and decoding. Other color space types such as 4:4:4 color space, however, can provide more desirable results for certain communications, for example, for communications of computer graphics type information video such as frame buffer output from a spreadsheet or browser program to a remote display.

A conventional video encode and decode process for input and output in the 4:4:4 color space converts from 4:4:4 color space to 4:2:0 color space, encodes, decodes and then converts back to 4:4:4 color space. In particular, a 4:4:4 frame buffer is translated to a 4:2:0 frame by a converter. The 4:2:0 frame is then encoded to obtain an encoded video bit stream. The encoded video bit stream is passed, such as via network communication, to a video decoder. The video decoder creates a 4:2:0 frame. This 4:2:0 frame is converted back into a 4:4:4 frame by a next converter, and the frame is saved into a 4:4:4 frame buffer. This results in an averaging of pixels for the resulting 4:4:4 color space of the 4:4:4 frame buffer. This averaging of pixels in the convention version between 4:4:4 and 4:2:0 color spaces results in lessened definition and detail in rendered 4:4:4 color space displays at the decoder, in comparison to that of the original graphic displayed at the encoder.

A better video and display solution which would be desirable for many applications in the 4:4:4 color space, which does not rely on averaging of pixels. It would be advantageous to avoid averaging operations, particularly, where the pixel data represent computer graphics type video and displays, such as with spreadsheets, other types of computer generated graphics, computer game graphics, or other exacting detail and color is desirable. Although certain video encoder/decoder systems have dedicated elements for operating with 4:4:4 color space video, these are uncommon and, in any event, are not widely employed.

It would therefore be desirable, and a significant improvement in the art and technology, to provide encoders and decoders for converting video from one color space format to another, with new and improved color and graphical display.

SUMMARY

According to certain embodiments of the invention, systems and methods for encoders and decoders to convert video, such as graphics, media, computer games, or other files, from one color space format, in particular, 4:4:4 color space, to another color space format, in particular, 4:2:0 color space, provide improved displays of video of 4:4:4 color space frames of original format input to the encoders.

An embodiment of the invention is a sender device for encoding a 4:4:4 color space frame of video as a plurality of encoded 4:2:0 color space frames. The plurality of encoded 4:2:0 color space encoded frames is convertibly decodable, identically, as the 4:4:4 color space frame. The sender device includes a memory for containing the 4:4:4 color space frame, a sender frame buffer of the memory, a sender converter communicatively connected to the sender frame buffer, for transmuting the 4:4:4 color space frame to a plurality of 4:2:0 color space frames, successively, of the sender frame buffer, and an encoder communicatively connected to the sender frame buffer, for respectively encoding, substantially immediately in real-time, each of the plurality of 4:2:0 color space frames, successively, of the sender frame buffer as the plurality of encoded 4:2:0 color space frames.

Another embodiment of the invention is a recipient device for convertibly decoding a plurality of encoded 4:2:0 color space frames received from an encode device, as a 4:4:4 color space frame of video. The encode device encodes a 4:4:4 color space frame to the plurality of encoded 4:2:0 color space frames. The recipient device includes a recipient frame buffer for successively receiving the plurality of encoded 4:2:0 color space frames, a decoder communicatively connected to the recipient frame buffer, for decoding each of the plurality of encoded 4:2:0 color space frame, in succession, to a plurality of 4:2:0 color space frames, in succession, contained in the recipient frame buffer, in succession, and a recipient converter communicatively connected to the recipient frame buffer, for transmuting the plurality of 4:2:0 color space frames in the recipient frame buffer to the 4:4:4 color space frame, identically, of the video.

Yet another embodiment of the invention is a method of coding a 4:4:4 color space frame of video as a plurality of encoded 4:2:0 color space frames. The plurality of encoded 4:2:0 color space encoded frames is convertibly decodable, identically, as the 4:4:4 color space frame. The method includes storing the 4:4:4 color space frame in a frame buffer of memory. converting the 4:4:4 color space frame to a plurality of 4:2:0 color space frames in the frame buffer, in succession, wherein a first one of the 4:2:0 color space frames includes data representing respective intensities of a first pixel and three surrounding pixels and data representing color of the first pixel of four pixels, a second one of the 4:2:0 color space frames includes data representing null intensity and respective color of one of the surrounding pixels, a third one of the 4:2:0 color space frames includes data representing null intensity and respective color of another of the surrounding pixels, and a fourth one of the 4:2:0 color space frames includes data representing null intensity and respective color of the other of the surrounding pixels, and encoding, in succession, each of the plurality of 4:2:0 color space frames in the frame buffer, to respective ones of the plurality of encoded 4:2:0 color space frames in the frame buffer.

Another embodiment of the invention is a method of constructing a 4:4:4 color space frame from a plurality of encoded 4:2:0 color space frames received from an encoder. The plurality of encoded 4:2:0 color space frames are a first encoded 4:2:0 color space frame including data representing respective intensities of a first pixel and three surrounding pixels and data representing color of the first pixel of four pixels, a second one of the 4:2:0 color space frames including data representing null intensity and respective color of one of the surrounding pixels, a third one of the 4:2:0 color space frames including data representing null intensity and respective color of another of the surrounding pixels, and a fourth one of the 4:2:0 color space frames including data representing null intensity and respective color of the other of the surrounding pixels. The method includes storing each of the first encoded 4:2:0 color space frame, the second encoded 4:2:0 color space frame, the third encoded 4:2:0 color space frame, and the fourth encoded 4:2:0 color space frame, in succession upon receipt, in a frame buffer of memory, decoding each of the first encoded 4:2:0 color space frame, the second encoded 4:2:0 color space frame, the third encoded 4:2:0 color space frame, and the fourth encoded 4:2:0 color space frame, in succession upon the step of storing, in the frame buffer, to a first 4:2:0 color space frame, a second 4:2:0 color space frame, a third 4:2:0 color space frame, and a fourth 4:2:0 color space frame, respectively, in the frame buffer, and converting, in succession upon the step of decoding, the first 4:2:0 color space frame to a 4:4:4 color space frame of data representing respective intensities of a first pixel and three surrounding pixels and data representing color of the first pixel, the second 4:2:0 color space frame to a second 4:4:4 color space frame of data representing respective intensities of the first pixel and three surrounding pixels and data representing respective colors of the first pixel and of one pixel of the three surrounding pixels, the third 4:2:0 color space frame to a third 4:4:4 color space frame of data representing respective intensities of the first pixel and three surrounding pixels and data representing respective colors of the first pixel and of the one pixel and another pixel of the three surrounding pixels, and the fourth 4:2:0 color space frame to a fourth 4:4:4 color space frame of data representing respective intensities of the first pixel and three surrounding pixels and data representing color of the first pixel and of the one pixel, the other pixel, and a last pixel of the three surrounding pixels, respectively, in the frame buffer. The fourth 4:4:4 color space frame of data is identical to a 4:4:4 color space frame of video previously encoded by an encoder as the plurality of encoded 4:2:0 color space frames.

Yet another embodiment of the invention is a method of encoding and decoding a video of a plurality of 4:4:4 color space frames. The method includes receiving successive ones of the 4:4:4 color space frame in a frame buffer of an encoder device, encoding each one of the 4:4:4 color space frame, in succession, by the encoder device, without averaging of pixels, as a plurality of encoded 4:2:0 color space frames in a frame buffer, communicating the plurality of encoded 4:2:0 color frames to a frame buffer of a decoder device, and decoding the plurality of encoded 4:2:0 color frames in respect of each one of the 4:4:4 color space frames, as a plurality of 4:4:4 color space frames in the frame buffer of the decoder device, the last of the plurality of the 4:4:4 color space frames is identical to the 4:4:4 color space frame, respectively, in the frame buffer of the encoder device.

Another embodiment of the invention is a system for communicating video. The video includes 4:4:4 color space frames. The system includes a 4:2:0 video encoder having a 4:4:4 to 4:2:0 color space frame converter, and a 4:2:0 video decoder having a 4:2:0 to 4:4:4 color space frame converter, communicatively connected to the 4:2:0 video encoder. The 4:2:0 video encoder, without conversion by the 4:4:4 to 4:2:0 color space frame converter, communicates the video as a plurality of encoded 4:2:0 color space frames to the decoder. The 4:2:0 video decoder, without conversion by the 4:2:0 to 4:4:4 color space frame converter, saves the video as a plurality of 4:4:4 color space frames in memory. Each of the plurality of 4:4:4 color space frames in memory of the decoder device is identical to a plurality of 4:4:4 color space frames, respectively, in the frame buffer of the encoder device for the step of encoding.

BRIEF DESCRIPTION OF THE DRAWINGS

The present invention is illustrated by way of example and not limitation in the accompanying figures, in which like references indicate similar elements, and in which:

FIG. 2 illustrates an example of pixels encoded with 4:4:4 and 4:2:0 color space, respectively, according to certain embodiments of the invention;

FIG. 3 illustrates another example of pixels encoded with 4:4:4 and 4:2:0 color space, respectively, according to certain embodiments of the invention;

DETAILED DESCRIPTION

Figure 1:
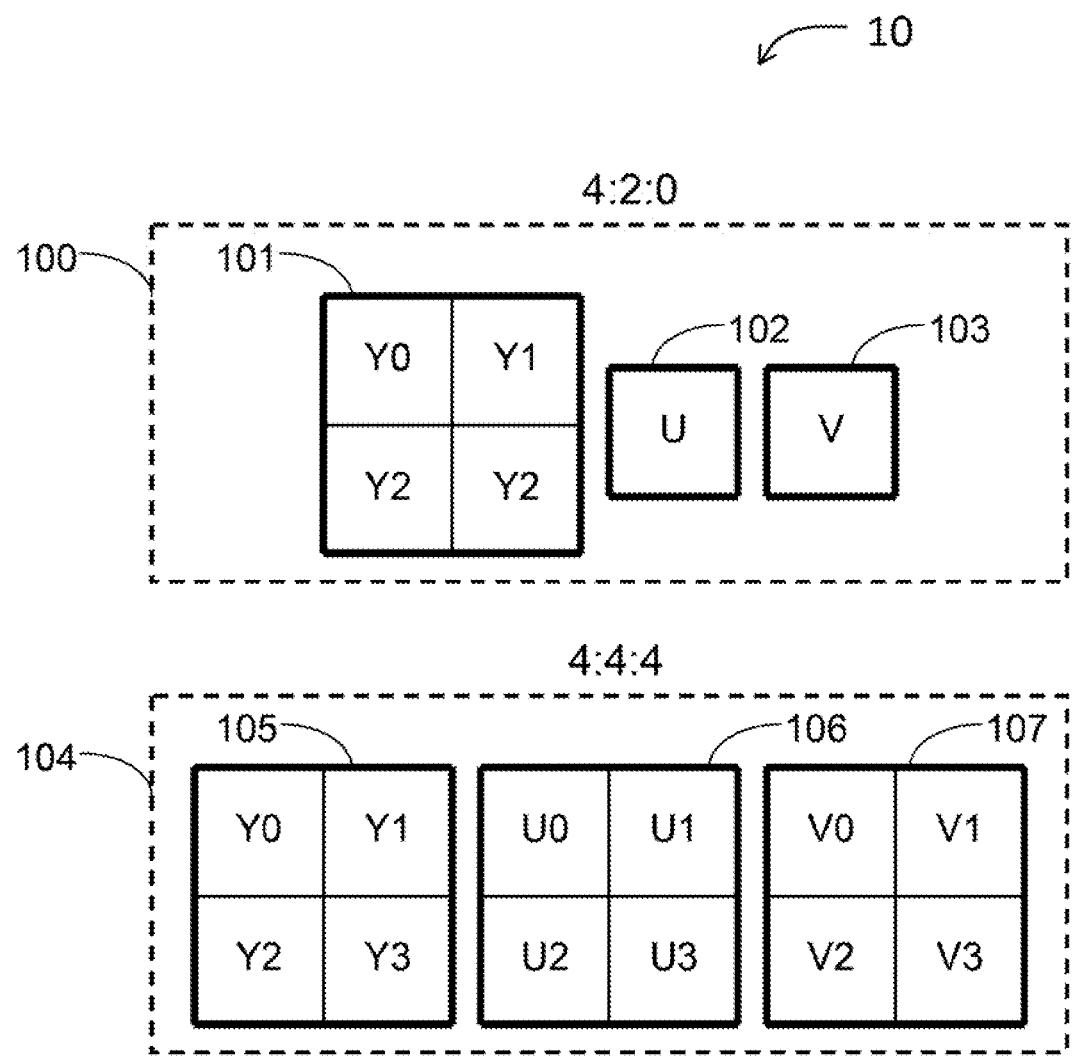
FIG. 1 illustrates a 4:2:0 color space and a 4:4:4 color space format, respectively, of coding of video, according to certain embodiments of the invention.

Referring to FIG. 1, a color space coding depiction 10 illustrates comparison of a 4:2:0 color space 100 and a 4:4:4 color space 104. For purposes of this disclosure, the term "color space" means both the data stored in memory representing a pixel display of particular color and intensity and also the pixel, itself, of a monitor, screen or other display device of a digital processor device and consequent color and intensity of such pixel. In the 4:2:0 color space 100, four pixels are coded with four Y 101 values and a single set of each of U 102 and V 103 values. The Y 101 values dictate intensity and the U 102 and V 103 values dictate color of the color space. Therefore in the 4:2:0 color space 100, a group of four pixels can have four different intensities but all have the same single color (e.g., Blue, Yellow, etc.). In the 4:4:4 color space 104, on the other hand, four pixels are coded with four Y 105 values, four U 106 values and four V 107 values. As with Y values 102 of the 4:2:0 color space 100, the four Y 105 values of the 4:4:4 color space 104 dictate intensity of the color space. The four U 105 and four V 107 values of the 4:4:4 color space 104, however, dictate color of different hue (i.e., of varied, or more than one, color) of the color space depending on the U 105 and V 107 actual values. Therefore with 4:4:4 coding, each pixel is represented by an individual intensity and an individual color via the four U 105 and four V 107 values and each pixel has color dictated by such values. In the case of each of the 4:2:0 color space 100 and the 4:4:4 color space, the Y values represent data stored in memory dictating intensity of a pixel of a display device and the U and V values represent data stored in memory dictating color of the pixel of the display and the Y 101 or 105, U 102 or 105, and V 103 or 106 values also are the pixel, itself, of the display device at particular instant for the particular values.

Figure 5:
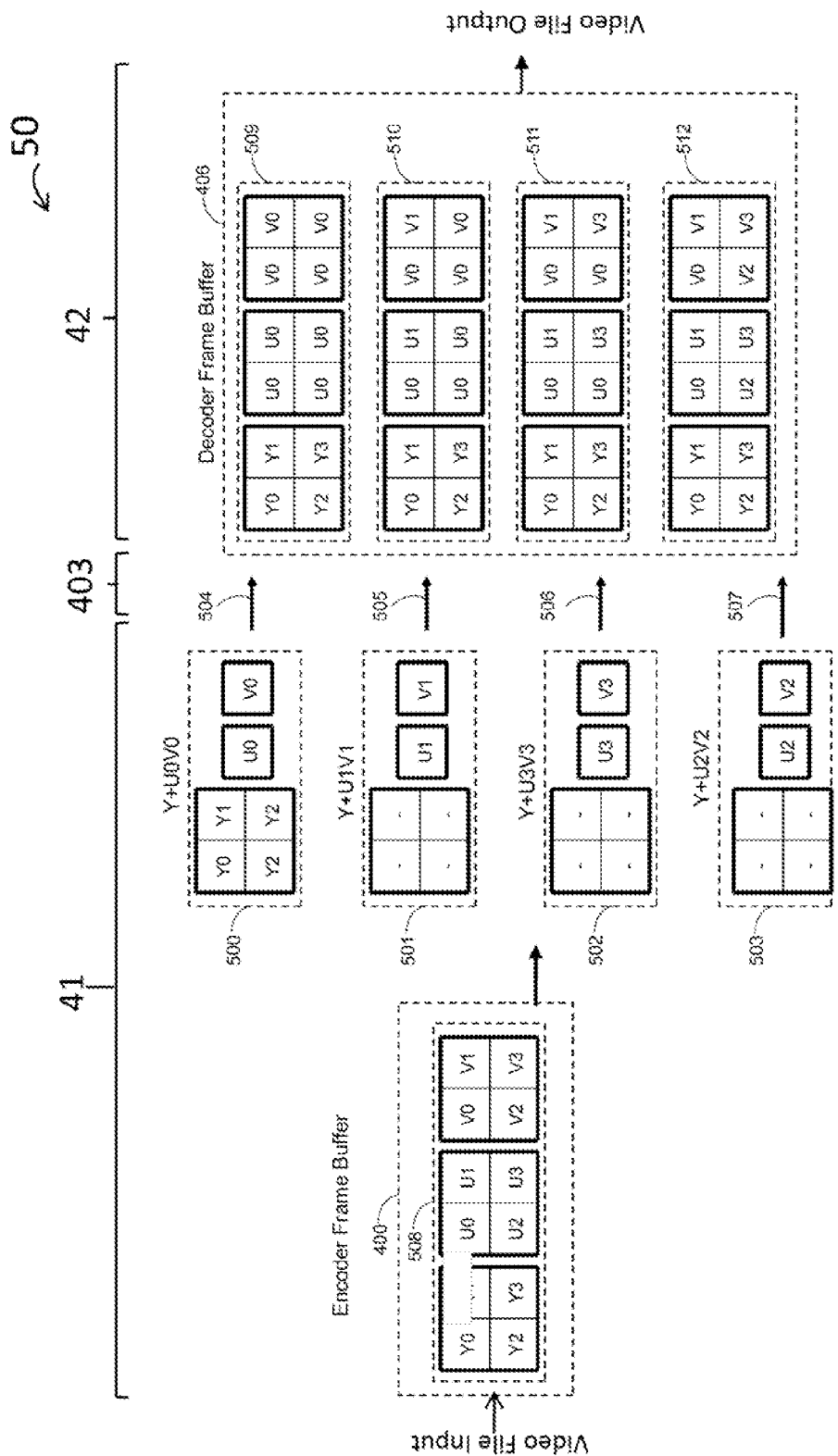
FIG. 5 illustrates a process of transforming 4:4:4 color space frames using 4:2:0 encoders and decoders, according to certain embodiments of the invention.
Figure 7:
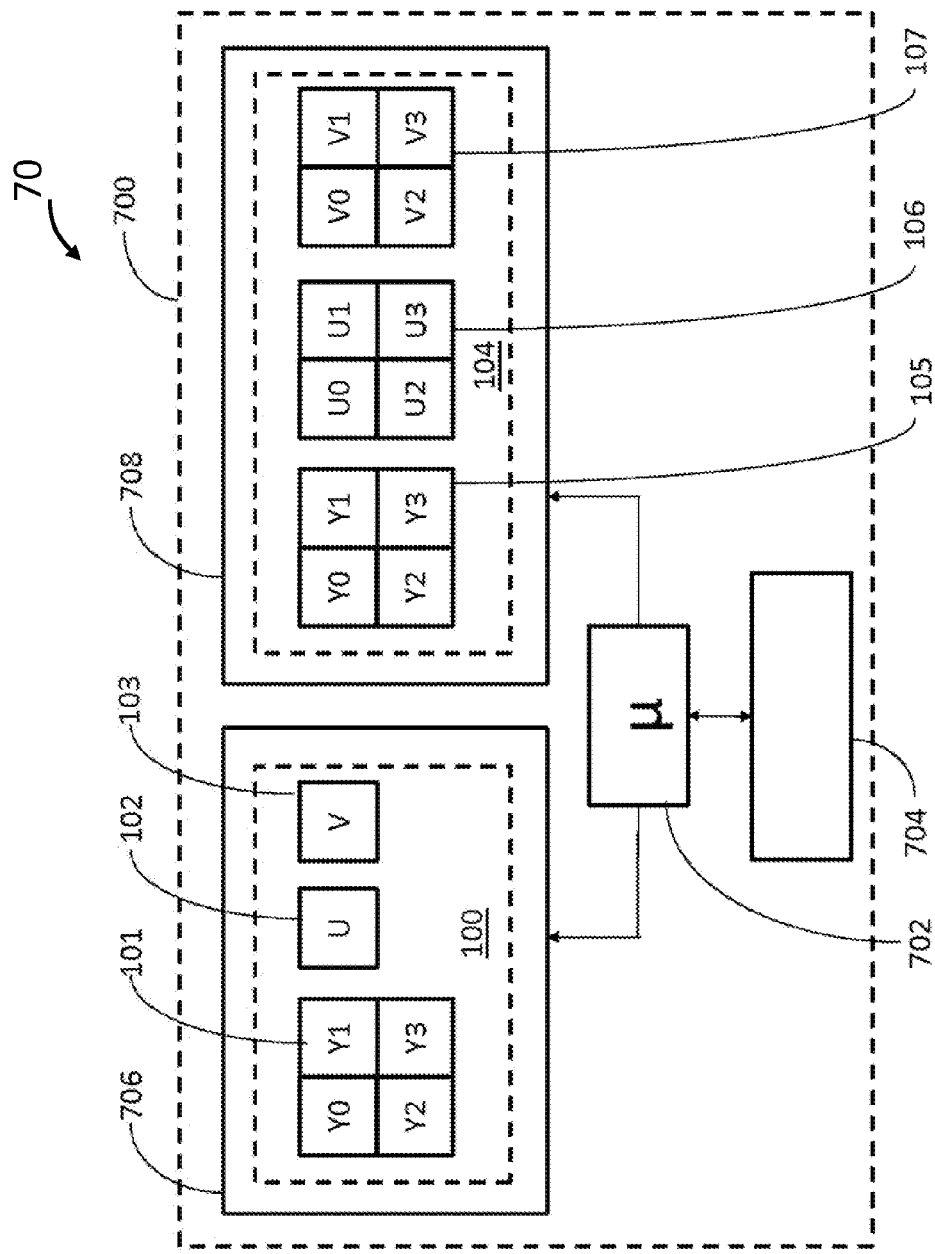
FIG. 7 illustrates a dual display system, one display depicting 4:2:0 color space pixels and the other display depicting 4:2:4 color space pixels, according to certain embodiments of the invention.

Referring to FIG. 7, in conjunction with FIG. 1, a display system 70 (shown in phantom) includes a processor 702, memory 704 communicatively connected to the processor, and a first display 706 and a second display 708 each communicatively connected to the processor. FIG. 5 is intended primarily as an example for purposes of further explanation and comparison of the 4:2:0 color space 100 (in phantom) and the 4:4:4 color space 104 (in phantom). Although in the example of FIG. 5 a single processor 702 and memory 704 is shared for the first display 706 and second display 708, typically, the 4:2:0 color space 100 is an intermediate form of a video, graphic, video or graphic frame, or other file or data stored or storable in non-transitory media (not shown in FIG. 5), communicated from one device for display by another device. The terms "video", "file", "graphic" and the like, are intended herein to refer to data or data sets representing video, file, or graphic display items, including, for example, real-time video, spreadsheet, game and other visual displays and/or output of processing, in conjunction with memory and a display device, the video, file, graphic or other data.

Conventional encoders (not shown) encode video and other file (via frames of the files) in 4:4:4 color space 104 for the 4:2:0 color space 100, for communication of the encoded video or file; and conventional decoders (not shown) decode the encoded video or file of the 4:2:0 color space 100 and must convert, by averaging pixels as described above, the video or file (via frames of the file) for the 4:4:4 color space 104 for display. For purposes of comparison and example, the first display 706 and the second display 708 are illustrated in FIG. 7 for side-by-side comparison of respective pixels 100 (i.e., 4:2:0 color space), 104 (i.e., 4:4:4 color space) of the displays 506, 508, respectively.

In the first display 706, four Y 101 pixels have particular intensity (i.e., from among four possible intensities) and a single set of each of U 102 and V 103 pixels have particular single color (i.e., only one color is possible for the 4:2:0 color space 100 pixel of the first display 706 as dictated by the U 102 and V 103 pixels). For the first display 706, pixel 0 color/intensity is Y0UV, pixel 1 color/intensity is Y1UV, pixel 2 color/intensity is Y2UV and pixel 3 color/intensity is Y3UV. In the second display 708, four Y 105 pixels have particular intensity (i.e., from among four possible intensities) and sets of four U 106 pixels and four Y 107 pixels. For the second display 708, pixel 0 intensity/color is Y0U0V0, pixel 1 intensity/color is Y1U1V1, pixel 2 intensity/color is Y2U2V2 and pixel 3 intensity/color is Y3U3V3. As will be described below in connection with FIG. 2 and FIG. 3, how similar or how different the display 706 and the display 708 may appear in viewing (to a human or other viewer) depends on both the particular value for the Y, U and V pixel, respectively, of each display 706, 708 in respective same location/orientation, and the Y, U and V pixels, respectively, surrounding the particular pixel (in respective same location/orientation) of each display 706, 708.

Referring now to FIG. 2 and FIG. 3, in conjunction, other color space coding depictions 20 and 30 each illustrate one possible (from among other possibilities) four-by-six pixel areas for comparison of a 4:2:0 color space 201, 301 and a 4:4:4 color space 200, 300. In FIG. 2, the 4:4:4 color space includes pixels of colors C1 and C2. Pixels of color C1 are located around the edges and a two-by-four pixel block of color C2 is located in the center. The 4:2:0 color space 201 in FIG. 2 (i.e., representing the same pixels of the 4:4:4 color space 200 in FIG. 2), instead, includes pixels of colors C3, C4, C5 and C5, which are averages of C1 and C2. The 4:4:4 color space 200 pixels display correct (i.e., accurate) colors. The 4:2:0 color space 201 pixels, however, show the result of the 4:2:0 UV color averaging. The 4:2:0 color space 201 coding changes the color of C1 pixels to C3 and C5, and changes the color of C2 pixels to C4 and C6, in the example. None of the pixels in the 4:2:0 color space 201 are the correct color. The incorrect pixel colors result because colors in a four-by-four pixel block are represented by a single color which is the average of the four pixels.

In FIG. 3, the four-by-six pixel area of the 4:4:4 color space 300 includes pixels of colors C1 and C2. A two-by-four pixel block of color C1 is located in the upper left hand corner and all other pixels are of color C2. The two-by-four pixel block is shifted up one pixel and to the right one pixel as compared to the representation of the 4:4:4 color space 200 in FIG. 2. The four-by-six pixel area of the 4:2:0 color space 301 (i.e., representing the same pixels of the 4:4:4 color space 300 in FIG. 3) also includes pixels of colors C1 and C2. In fact, the 4:4:4 color space 300 and the 4:2:0 color space 301 are exactly the same. Because the two-by-four pixel block is centered on a four pixel boundary, the 4:2:0 color space 301 displays the same correct colors as the 4:4:4 color space 300. Thus, by moving an area one pixel, the pixel's color is changed in 4:2:0 color space 301. This explains why a TV or movie encoded in 4:2:0 color space tends to be generally acceptable for viewing, however, computer graphics (and other color intensive content display, for example, a spreadsheet, computer game, or other file) encoded in 4:2:0 color space can be visually inadequate or undesirable. Referring back to FIG. 5, when displaying pixels of FIG. 2, the display 506 and the display 508 appear in viewing (to a human or other viewer) to be different; whereas, on the other hand, displaying pixels of FIG. 3, the display 506 and the display 508 would appear in viewing (to a human or other viewer) to be same.

Figure 4:
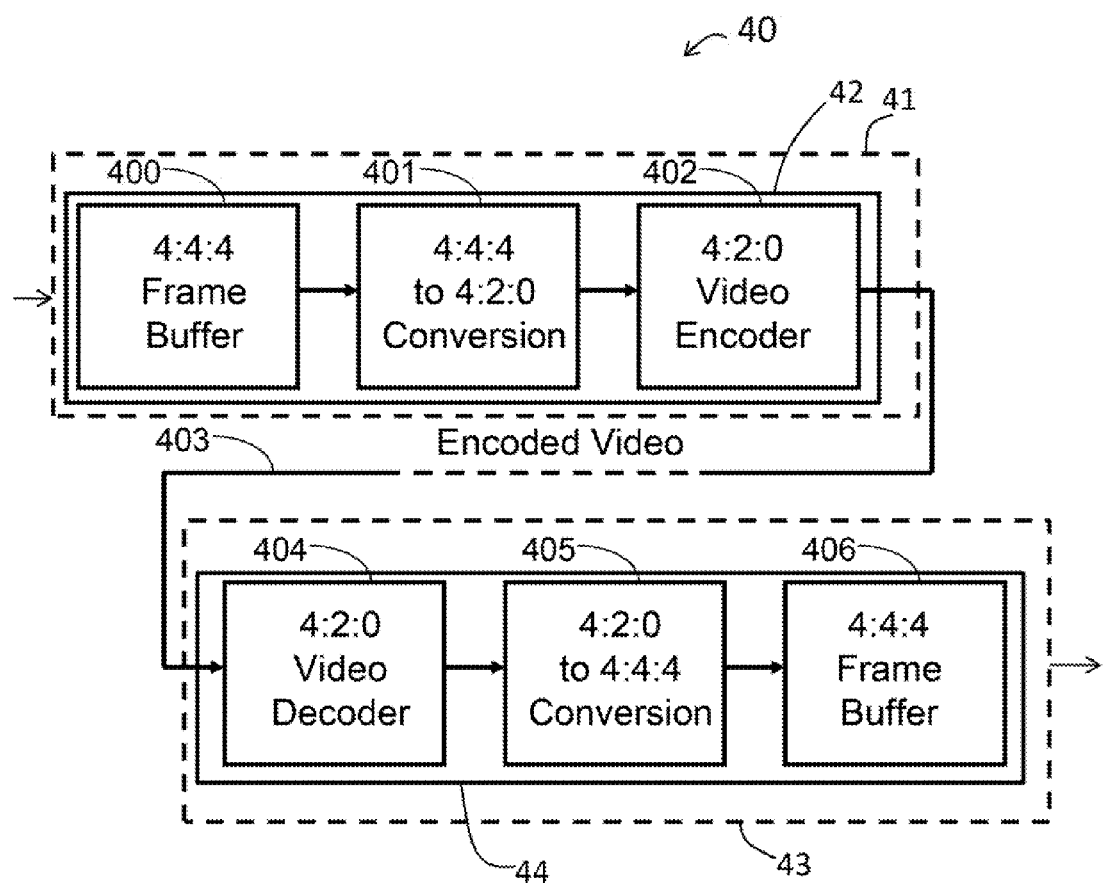
FIG. 4 illustrates a video encode and decode process for 4:4:4 color space operations, according to certain embodiments of the invention.

Referring now to FIGS. 4 and 5, a system 40 or 50 of a first computer system 41 (in phantom) includes or communicatively controls an encoding system 42 and a second computer system 43 (in phantom) includes or communicatively controls a decoding system 44, the first computer system 41 and the second computer system 43 being communicatively connected by a wired, wireless, optical, switched, Internet, LAN, WAN or other communication network, a wire or wireless (e.g., WiFi, cellular, satellite, infrared, Bluetooth™), or other communication link or links, or combinations of these or any other communication network or networks (collectively, communication link 403). In certain embodiments, a unitary computer system (not shown) is both the first computer system 41 and the second computer system 43, or parts or portions thereof are commonly shared. Hereinafter, the general term "computer system" is used to refer to a computer system of an encoder, decoder, or both, as applicable in the context. Further, hereinafter the term "encode side" is used to refer to the computer system of an applicable encoder and the term "decode side" is used to refer to the computer system of an applicable decoder.

The system 40, via the encoder 42 and the decoder 44, translates 4:2:0 color space graphics to 4:4:4 color space graphics, as follows. A 4:4:4 color space frame buffer 400 on the encode side (i.e., computer system 41) is communicated over a communications link 403 and is reconstructed as a 4:4:4 color space frame buffer 406 on the decode side. On the encode side, a 4:4:4 color space graphics data set is in a 4:4:4 frame buffer 400. A converter 401 of the encode side (i.e., modified in comparison to an encoder converter which converts 4:4:4 color space to 4:2:0 color space) transfers, without conversion, the UV values of the 4:4:4 color space data set to a video encoder 402 as four separate value set frames 500, 501, 502, 503, in a sequential frame-by-frame manner. The four separate value set frames 500, 501, 502, 503 are created and then each encoded by a 4:2:0 video encoder 402. The encoded video of the value set frames 500, 501, 502, 503 passes 403 from the encoder 402 for example, via communication by the encode side over a communication link 403 to a decode side, as in four sequential transfers 504, 505, 506, 507, (i.e., one for each frame) to a 4:2:0 video decoder 404 of the decode side.

On the decode side, the video decoder 404 receives the sequential transfers 504, 505, 506, 507 decodes the communicated encoded video of each of the value set frames 500, 501, 502, 503, and passes the decoded data of the value set frames 500, 501, 502, 503 to a converter 405 of the decode side. The converter 405 (i.e., modified in comparison to a decoder converter which converts 4:2:0 color space to 4:4:4 color space) transfers, without conversion, the same UV values, per the four value set frames 500, 501, 502, 503 for the 4:4:4 color space data set (i.e., same UV values of the four frames 500, 501, 502, 503 on the encode side) and stores the UV values in a 4:4:4 frame buffer 406 in four buffer segments 509, 510, 511, 512 each overlaying the values from the previous buffer segment. The UV values are stored in the 4:4:4 frame buffer 406 in particular location of the 4:4:4 frame buffer 406, consistent with the locations for the original 4:4:4 color space data set of the 4:4:4 frame buffer 400, creating sequentially four buffer segments 509, 510, 511, 512 of the frame buffer 406. Thus. after decoding the last frame 503 of the buffer set and saving it into the frame buffer 406, the 4:4:4 frame buffer 406 contains the buffer segment 512 having same Y, U, V values of pixels as the original values of pixels in the frame buffer 400. The contents of the buffer segment 512 output from decoding are the same 4:4:4 color space frame as the 4:4:4 color space frame originally input for encoding.

In operation, on the encode side, the 4:4:4 data of the frame buffer 400 is passed to the 4:4:4 to 4:2:0 converter 401, and, without conversion from 4:4:4 to 4:2:0 color space, the converter 401 delivers the first value set frame 500 to the encoder 402. The encoder 402 encodes the first frame 500 and delivers 504, such as via network or other communication, the first frame 500 to the decoder side. The decoder 404 receives the first frame 504. The decoder 404 decodes the first frame 504 and passes the decoded first frame to the 4:2:0 to 4:4:4 converter 405. Rather than converting from 4:2:0 to 4:4:4 color space, the converter 405 instead writes, per same location as with the frame buffer 400, the Y values (Y0/Y1/Y2/Y3) and U0/V0 values of the buffer segment 509 in the 4:4:4 frame buffer 406 (shown in FIG. 5 as buffer segment 500).

The same is repeated for the second value set frame 501; however, the second frame 501 from the encode side is reconstructed by the decode side to contain U1/V1 values of the buffer segment 510, as illustrated. As the Y values from the first frame 500 are not changed for the second frame 501 of the 4:4:4 color space, the encoder 402 simply skips coding and sending the Y values again as part of the second frame 501. The second frame 501 is sent 505 from the encode side and, at the decoder side, received and decoded by the video decoder 404 of the decode side. After decoding by the video decoder 404, the decoded second frame is passed to the 4:2:0 to 4:4:4 converter 405, and without conversion, the U1/V1 values of the buffer segment 510 are saved, to same location of the 4:4:4 frame buffer 406 (shown in FIG. 5 as frame buffer segment 510) as with frame buffer 400 for the 4:4:4 color space.

The same is repeated (as with the second frame 501) for the third value set frame 502 and the fourth value set frame 503. In particular, the third frame 502 includes the U3/V3 values and the fourth frame 503 includes the U2/V2 values. Each of these frames is sent 506, 507 to the decode side, where decoded by the video decoder 404, passed to the converter 405, and written to the frame buffer 406 per same location for the 4:4:4 color space (shown as buffer segment 511 and buffer 512 segment, sequentially).

The frame buffer 406 now contains the complete 4:4:4 values from the encoder side, with Y/U/V values in same location of frame buffer 406 as originally of frame buffer 400. As described above, the U/V values are sent (from encode to decode side) in a clockwise manner U0V0, U1V1, U3V3 and then U2V2; adjacent U/V pairs are always sequentially sent and written. These sequential pairs have a good chance of being identical, therefore reducing encoding/decoding processing requirements. Additionally, because Y values are sent only once, bandwidth requirements for communicating the 4:4:4 color space data set for pixels is greatly reduced in quantity of data for the resulting bit stream.

Figure 6:
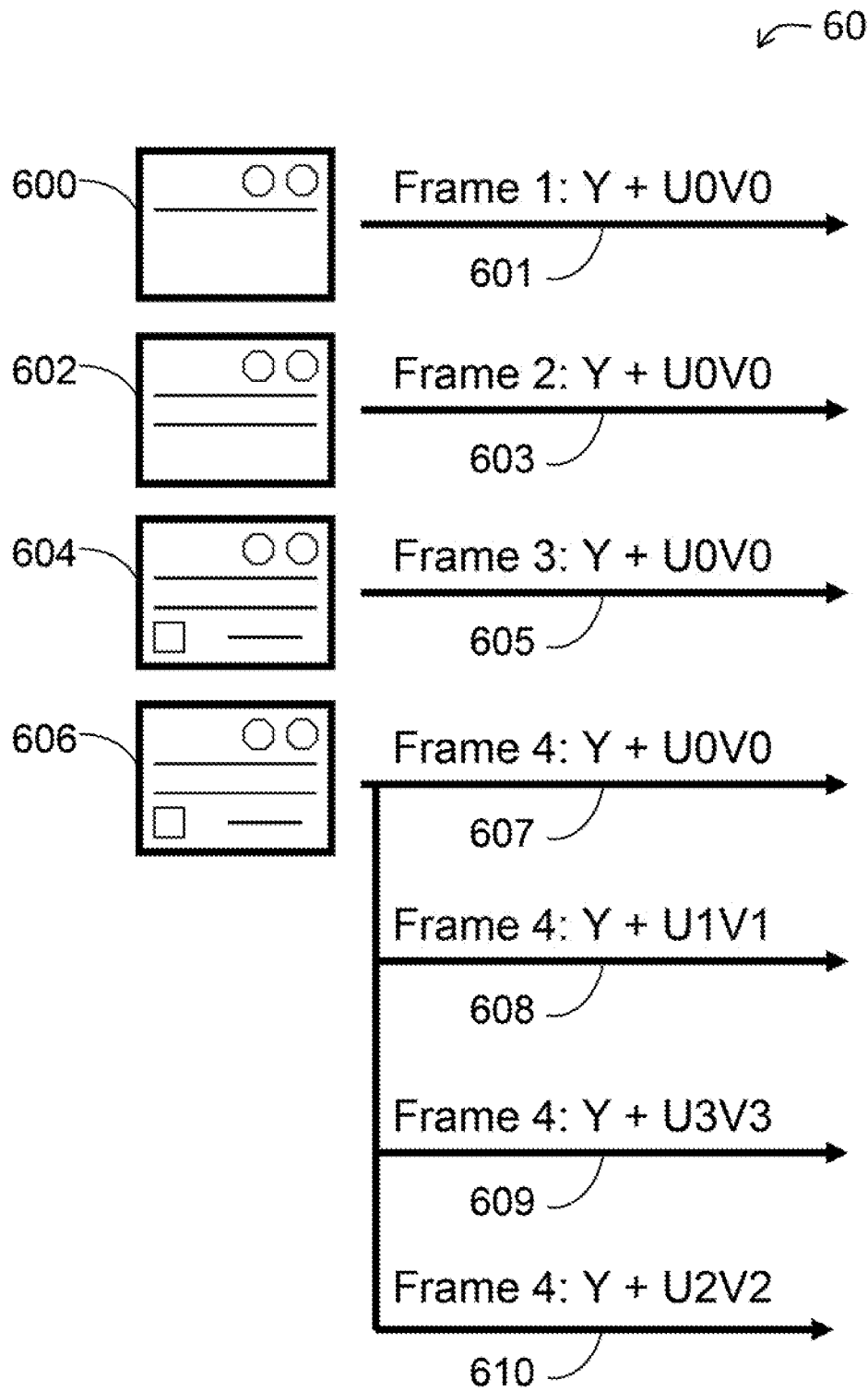
FIG. 6 illustrates a process for reducing bandwidth employed for a 4:2:0 color space communication and 4:4:4 color space communication, according to certain embodiments of the invention.

Referring to FIG. 6, another embodiment of an encoder system 60 reduces bandwidth requirements for communicating the 4:4:4 color space data set. In the embodiment, usage of both 4:2:0 and 4:4:4 color spaces is combined when there is variation in the amount of changed data activity in the video stream. When data sets communicated change frequently between respective sets, displaying 4:4:4 pixels may have minimal visual impact, thus, no visual quality is lost by only sending 4:2:0 pixels during these times. In the embodiment, where only large changes between communicated frames occur, only the Y+U0V0 (i.e., approximately 4:2:0 color space, but no averaging of the 4 pixels) frames are sent. Further, at times when frame change is low or none, the three additional U1V1, U3V3, U2V2 value sets are sent.

As shown in FIG. 6, for respective frames where large changes occur only Y−U0V0 value sets are sent. First frame 1 600 is sent 601 as a Y+U0V0 value set. As more frame change occurs frames 2 602, frame 3 604 and frame 4 606 are also sent as Y+U0V0 value sets 602, 603 and 605 respectively.

Frame 606 is the last frame that changes, so after the Y–Y0V0 value set portion of Frame 606 is sent 607, frame 4 value set Y–U1V1 608 is sent, frame 4 value set Y–U3V3 609 is sent and finally frame 4 value set Y–U2V2 610 is sent. Now the decoder side has the complete 4:4:4 frame. Rather than sending 4 frames each made up of 4 value sets for a total of 16 frames, only 7 total frames have been sent.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sender device for encoding a 4:4:4 color space frame of video as a plurality of encoded 4:2:0 color space frames, the plurality of encoded 4:2:0 color space encoded frames is convertibly decodable, identically, as the 4:4:4 color space frame, comprising:
    a memory for containing the 4:4:4 color space frame;
    a sender frame buffer of the memory;
    a sender converter communicatively connected to the sender frame buffer, for transmuting the 4:4:4 color space frame to a plurality of 4:2:0 color space frames, successively, of the sender frame buffer; and
    an encoder communicatively connected to the sender frame buffer, for respectively encoding, substantially immediately in real-time, each of the plurality of 4:2:0 color space frames, successively, of the sender frame buffer as the plurality of encoded 4:2:0 color space frames.

2. The encode device of claim 1, further comprising:
    a sender processor communicatively connected to the sender frame buffer, the sender converter and the encoder, for controlling the sender converter and the encoder and, in conjunction with the sender converter and the encoder, copying the 4:4:4 color space frame, each of the plurality of 4:2:0 color space frames, in succession, and each of the plurality of encoded 4:2:0 color space frames, in succession, to and from the sender frame buffer.

3. A recipient device for convertibly decoding a plurality of encoded 4:2:0 color space frames received from an encode device, as a 4:4:4 color space frame of video, the encode device encodes a 4:4:4 color space frame to the plurality of encoded 4:2:0 color space frames, comprising:
    a recipient frame buffer for successively receiving the plurality of encoded 4:2:0 color space frames;
    a decoder communicatively connected to the recipient frame buffer, for decoding each of the plurality of encoded 4:2:0 color space frames, in succession, to a plurality of 4:2:0 color space frames, in succession, contained in the recipient frame buffer, in succession; and
    a recipient converter communicatively connected to the recipient frame buffer, for transmuting the plurality of 4:2:0 color space frames in the recipient frame buffer to the 4:4:4 color space frame, identically, of the video.

4. The recipient device of claim 3, further comprising:
    a recipient processor communicatively connected to the recipient frame buffer, the decoder and the recipient converter, for controlling the decoder and the recipient converter, and, in conjunction with the converter and the encoder, copying each of the plurality of encoded 4:2:0 color space frames, in succession, each of the plurality of 4:2:0 color space frames, in succession, and the 4:4:4 color space frame, in succession, to and from the recipient frame buffer.

5. A system for delivering a video, the system includes a sender device for encoding a 4:4:4 color space frame of video as a plurality of encoded 4:2:0 color space frames, the plurality of encoded 4:2:0 color space encoded frames is convertibly decodable, identically, as the 4:4:4 color space frame, and a recipient device for convertibly decoding the plurality of encoded 4:2:0 color space frames from the sender device, as a 4:4:4 color space frame of video, comprising:
    a memory of the sender device for containing the 4:4:4 color space frame;
    a sender frame buffer of the memory;
    a sender converter communicatively connected to the sender frame buffer, for transmuting the 4:4:4 color space frame to a plurality of 4:2:0 color space frames, successively, of the sender frame buffer;
    an encoder communicatively connected to the sender frame buffer, for respectively encoding, substantially immediately in real-time, each of the plurality of 4:2:0 color space frames, successively, of the sender frame buffer as the plurality of encoded 4:2:0 color space frames;
    a recipient frame buffer of the recipient device for successively receiving the plurality of encoded 4:2:0 color space frames;
    a decoder communicatively connected to the recipient frame buffer, for decoding each of the plurality of encoded 4:2:0 color space frames, in succession, to a plurality of 4:2:0 color space frames, in succession, contained in the recipient frame buffer, in succession;
    a recipient converter communicatively connected to the recipient frame buffer, for transmuting the plurality of 4:2:0 color space frames in the recipient frame buffer to the 4:4:4 color space frame, identically, of the video;
    a communication network communicatively connected to the sender device and the recipient device;
    wherein the sender device, via the communication network, delivers to the recipient device the encoded 4:2:0 color space frame from the sender frame buffer, in substantially immediate real-time, after the encoded 4:2:0 color space frame is contained in the sender frame buffer; and
    wherein the recipient device, via the communication network, receives from the sender device the encoded 4:2:0 color space frame, and, in substantially immediate real-time, decodes, converts the encoded 4:2:0 color space frame to the 4:4:4 color space video contained in the recipient frame buffer.

6. The system of claim 5,
wherein the 4:4:4 color space frame of the video when contained in the sender frame buffer prior to transformation by the sender converter and encoding by the encoder is:

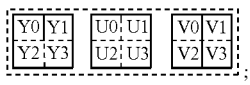

wherein the plurality of encoded 4:2:0 color space frames when successively contained in the sender frame buffer, each just prior to sending to the recipient device are:

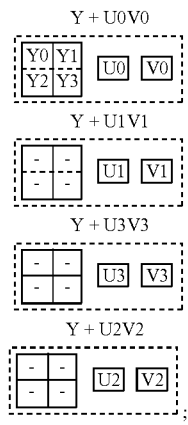

wherein the 4:4:4 color space frame when contained in the recipient frame buffer after decoding by the decoder and transformation by the recipient converter is the 4:4:4 color space frame, identically, of the video, as last here:

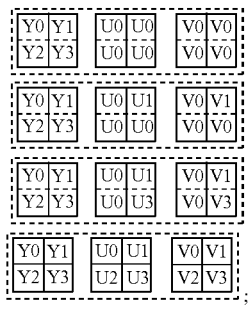

where Y represents pixel intensity, and U and V each represent pixel color.

7. A method of coding a 4:4:4 color space frame of video as a plurality of encoded 4:2:0 color space frames, the plurality of encoded 4:2:0 color space encoded frames is convertibly decodable, identically, as the 4:4:4 color space frame, comprising the steps of:
storing the 4:4:4 color space frame in a frame buffer of memory;
converting the 4:4:4 color space frame to a plurality of 4:2:0 color space frames in the frame buffer, in succession, wherein a first one of the 4:2:0 color space frames includes data representing respective intensities of a first pixel and three surrounding pixels and data representing color of the first pixel of four pixels, a second one of the 4:2:0 color space frames includes data representing null intensity and respective color of one of the surrounding pixels, a third one of the 4:2:0 color space frames includes data representing null intensity and respective color of another of the surrounding pixels, and a fourth one of the 4:2:0 color space frames includes data representing null intensity and respective color of the other of the surrounding pixels;
encoding, in succession, each of the plurality of 4:2:0 color space frames in the frame buffer, to respective ones of the plurality of encoded 4:2:0 color space frames in the frame buffer.

8. The method of claim 7, further comprising the step of:
processingly controlling the steps of storing, converting and encoding.

9. The method of claim 7, further comprising the step of:
communicating each of the plurality of encoded 4:2:0 color space frames in the frame buffer, in succession, substantially immediately in real-time upon the step of encoding as to each of the 4:2:0 color space frames, respectively.

10. A method of constructing a 4:4:4 color space frame from a plurality of encoded 4:2:0 color space frames received from an encoder, the plurality of encoded 4:2:0 color space frames are a first encoded 4:2:0 color space frame including data representing respective intensities of a first pixel and three surrounding pixels and data representing color of the first pixel of four pixels, a second one of the 4:2:0 color space frames including data representing null intensity and respective color of one of the surrounding pixels, a third one of the 4:2:0 color space frames including data representing null intensity and respective color of another of the surrounding pixels, and a fourth one of the 4:2:0 color space frames including data representing null intensity and respective color of the other of the surrounding pixels, comprising the steps of:
storing each of the first encoded 4:2:0 color space frame, the second encoded 4:2:0 color space frame, the third encoded 4:2:0 color space frame, and the fourth encoded 4:2:0 color space frame, in succession upon receipt, in a frame buffer of memory;
decoding each of the first encoded 4:2:0 color space frame, the second encoded 4:2:0 color space frame, the third encoded 4:2:0 color space frame, and the fourth encoded 4:2:0 color space frame, in succession upon the step of storing, in the frame buffer, to a first 4:2:0 color space frame, a second 4:2:0 color space frame, a third 4:2:0color space frame, and a fourth 4:2:0 color space frame, respectively, in the frame buffer; and
converting, in succession upon the step of decoding, the first 4:2:0 color space frame to a 4:4:4 color space frame of data representing respective intensities of a first pixel and three surrounding pixels and data representing color of the first pixel, the second 4:2:0 color space frame to a second 4:4:4 color space frame of data representing respective intensities of the first pixel and three surrounding pixels and data representing respective colors of the first pixel and of one pixel of the three surrounding pixels, the third 4:2:0 color space frame to a third 4:4:4 color space frame of data representing respective intensities of the first pixel and three surrounding pixels and data representing respective colors of the first pixel and of the one pixel and another pixel of the three surrounding pixels, and the fourth 4:2:0 color space frame to a fourth 4:4:4 color space frame of data representing respective intensities of the first pixel and three surrounding pixels and data representing color of the fist pixel and of the one pixel, the other pixel, and a last pixel of the three surrounding pixels, respectively, in the frame buffer;

wherein the fourth 4:4:4 color space frame of data is identical to a 4:4:4 color space frame of video previously encoded by an encoder as the plurality of encoded 4:2:0 color space frames.

11. The method of claim 10, further comprising the step of: processingly controlling the steps of storing, decoding and converting.

12. The method of claim 10, further comprising the step of: communicating the fourth 4:4:4 color space frame of data in the frame buffer for render by a device selected from the group of: a media player, a computer program stored in non-transitory memory, and another processing device.

13. The method of claim 7, further comprising the step of communicating each of the plurality of 4:2:0 color space frames in the frame buffer, in succession, substantially immediately in real-time upon the step of encoding as to each of the 4:2:0 color space frames, respectively, to the step of storing each of the first encoded 4:2:0 color space frame, the second encoded 4:2:0 color space frame, the third encoded 4:2:0 color space frame, and the fourth encoded 4:2:0 color space frame, in succession upon receipt, in the frame buffer of memory;

wherein a video including the 4:4:4 color space frame encoded by an encoder is, substantially in real time, decoded and processable as the video of the 4:4:4 color space frame.

14. A method of encoding and decoding a video of a plurality of 4:4:4 color space frames, comprising the steps of:
receiving successive ones of the 4:4:4 color space frame in a frame buffer of an encoder device;
encoding each one of the 4:4:4 color space frame, in succession, by the encoder device, without averaging of pixels, as a plurality of encoded 4:2:0 color space frames in a frame buffer;
communicating the plurality of encoded 4:2:0 color frames to a frame buffer of a decoder device;
decoding the plurality of encoded 4:2:0 color frames in respect of each one of the 4:4:4 color space frames, as a plurality of 4:4:4 color space frames in the frame buffer of the decoder device, the last of the plurality of the 4:4:4 color space frames is identical to the 4:4:4 color space frame, respectively, in the frame buffer of the encoder device.

15. The method of claim 14, wherein the step of communicating is via the Internet.

16. A system for communicating video, the video includes a plurality of 4:4:4 color space frames, comprising:
a 4:2:0 video encoder having a 4:4:4 to 4:2:0 color space frame converter, the 4:2:0 video encoder includes a frame buffer; and
a 4:2:0 video decoder having a 4:2:0 to 4:4:4 color space frame converter, communicatively connected to the 4:2:0 video encoder, the 4:2:0 video decoder includes memory;

wherein the 4:2:0 video encoder, without conversion by any 4:4:4 to 4:2:0 color space frame converter, communicates the video as a plurality of encoded 4:2:0 color space frames to the 4:2:0 video decoder;

wherein the 4:2:0 video decoder, without conversion by any 4:2:0 to 4:4:4 color space frame converter, saves the video as a plurality of 4:4:4 color space frames in memory;

wherein each of the plurality of 4:4:4 color space frames in memory of the 4:2:0 video decoder is identical to corresponding ones of the plurality of 4:4:4 color space frames, respectively, of the 4:2:0 video encoder.

17. The system of claim 16, wherein the 4:2:0 video encoder communicates four sequential encoded frames to the 4:2:0 video decoder, for each of the 4:4:4 color space frames of video in the frame buffer of the 4:2:0 video encoder, and each of the four sequential encoded frames in the frame buffer of the 4:2:0 video encoder communicated to memory of the 4:2:0 video decoder, includes, respectively, four U data representing intensity of pixels in 4:4:4 color space and four V data representing color of pixels in 4:4:4 color space.

18. The system of claim 17,
wherein a first of the four sequential encoded frames in the frame buffer of the 4:2:0 video encoder communicated to memory of the 4:2:0 video decoder also includes, respectively, four Y data representing color of pixels in 4:4:4 color space is included in only the first of the four frames;
wherein no Y data representing color of pixels in 4:4:4 color space is included in any other of the four sequential encoded frames; and
wherein each of the four U data representing intensity of pixels in 4:4:4 color space, and each of the four V data representing color of pixels in 4:4:4 color space, are included in respective frames in a clockwise sequence, from frame to frame for the four sequential encoded frames.

19. The system of claim 16,
wherein the 4:2:0 video encoder converts and then encodes each of the 4:4:4 color space frames to corresponding ones of four sequential encoded frames, each of the four sequential encoded frames are a respective encoded 4:2:0 color space frame;
wherein only the four sequential encoded frames are communicated to the 4:2:0 video decoder, and the 4:2:0 video encoder does not otherwise convert or communicate any other 4:2:0 color space frame;
wherein the 4:2:0 video decoder, on receiving, in succession, each respective one of the four sequential encoded frames, immediately decodes the respective one of the four sequential encoded frames and converts the one of the sequential encoded frame, as decoded, to a 4:4:4 color space frame, and the 4:2:0 video decoder does not otherwise decode or convert any other frames;
wherein the 4:4:4 color space frame last created from converting each of the four sequential encoded frames is, identically, the corresponding 4:4:4 color space frame of the video at the 4:2:0 video encoder.

* * * * *